June 22, 1937.                C. M. WAGELEY                2,084,660
                          LOCOMOTIVE DRIVER BRAKE
                            Filed Jan. 18, 1936
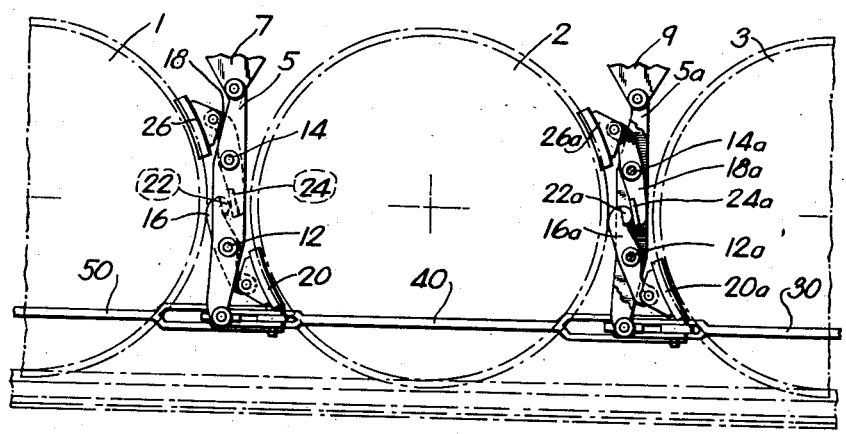
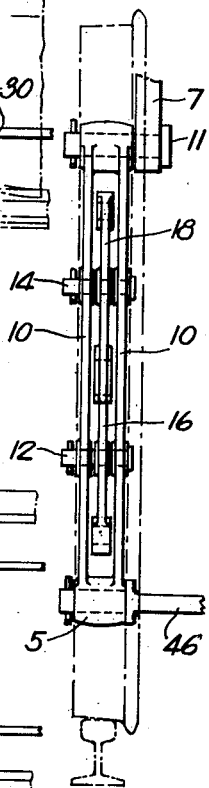
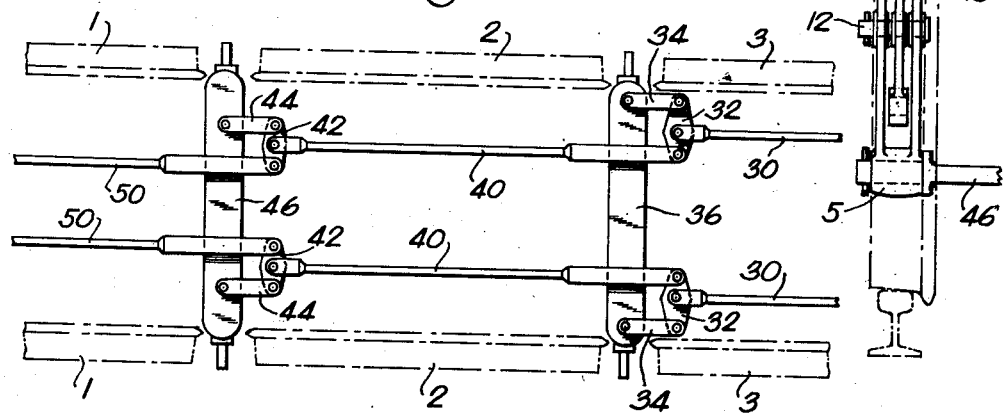
INVENTOR
CHARLES M. WAGELEY
BY Wm. M. Cady
ATTORNEY Patented June 22, 1937

2,084,660

UNITED STATES PATENT OFFICE 2,084,660

LOCOMOTIVE DRIVER BRAKE

Charles M. Wageley, Kirkwood, Mo., assignor to The American Brake Company, Wilmerding, Pa., a corporation of Missouri Application January 18, 1936, Serial No. 59,708

16 Claims. (Cl. 188—46)

This invention relates to a vehicle brake apparatus and more particularly to brake apparatus adapted to provide clasp brakes for the driving wheels of a locomotive.

As locomotives are usually constructed there is only a limited amount of space between the driving wheels with the result that it is impossible to install the usual forms of clasp brake apparatus to these wheels of a locomotive.

It is the principal object of this invention to provide a brake apparatus which provides means to apply clasp brakes to the driving wheels of a locomotive.

A further object of the invention is to provide a brake apparatus for use on a vehicle having a series of wheels positioned adjacent each other, and which provides means to employ a plurality of brake shoes on each of the wheels.

Another object of the invention is to provide a locomotive brake apparatus having a brake hanger having a pair of shoes supported thereon, one of the shoes being adapted to engage one wheel and the other of the shoes being adapted to engage a different wheel.

A further object of the invention is to provide a brake equipment for a car having a series of wheels placed adjacent each other, the brake equipment including a brake hanger having a pair of brake shoes pivotally supported thereon, the brake hanger being pivotally supported from the vehicle structure and having an operating member pivotally connected thereto, the equipment being arranged so that all of the pivotal connections are in substantially the same plane so that torsional stresses on the various parts of the equipment during an application of the brakes are at a minimum.

Other objects of the invention and features of novelty will be apparent from the following description taken in connection with the accompanying drawing in which, Fig. 1 is a fragmentary diagrammatic view of a locomotive equipped with the brake apparatus provided by this invention, Fig. 2 is a diagrammatic view of a portion of the brake rigging employed in connection with the brake apparatus shown in Fig. 1, and Fig. 3 is an elevational view of one of the brake hangers employed in the brake apparatus shown in Fig. 1.

Referring to the drawing the brake apparatus provided by this invention is shown in connection with a locomotive, not shown, having a series of pairs of driving wheels, three of which are shown in broken lines and are indicated by the reference numerals 1, 2 and 3.

The brake equipment provided by my invention includes brake hangers 5 and 5a located on each side of the locomotive. These hangers are identical in construction and are pivotally supported from suitable portions of the locomotive structure, such as brackets 7 and 9, and are disposed in planes which extend between the locomotive driving wheels.

The construction of the brake hanger 5 is shown in Fig. 3 of the drawing, and as therein illustrated the hanger comprises parallel spaced portions 10 which are joined at their ends. The upper end of the hanger has a bore extending therethrough and adapted to receive a pin 11 by means of which the hanger is supported from the bracket 7. The lower end of the hanger has a bore extending therethrough and adapted to receive the end of a brake beam 46 incorporated in the brake rigging.

The brake hanger 5 has pivotally secured thereto, on spaced pins 12 and 14, levers 16 and 18. The lever 16 has a brake shoe 20 pivotally secured to one end thereof and adapted to engage the wheel 2 in a zone located below the horizontal plane passing through the axes of the wheels. The other end of the lever 16 has formed thereon a rounded portion 22 which is adapted to engage the bearing face 24 formed on one end of the lever 18. The other end of the lever 18 has pivotally secured thereto a brake shoe 26 which is adapted to engage the wheel 1 in a zone located above the horizontal plane extending through the axes of the wheels.

As is clearly shown in Fig. 3 of the drawing the pivotal connection between the brake hanger and the bracket to which it is secured, between the brake hanger and the brake beam 46, and between the levers 16 and 18 and the brake hanger are located in substantially the same plane, which is also the plane in which the brake shoes are pivotally secured to the levers 16 and 18, and in which the brake shoes engage the wheels.

The brake hanger 5a is identical in construction with the brake hanger 5, and has pivotally secured thereon by means of pins 12a and 14a, levers 16a and 18a. These levers have pivotally secured thereto brake shoes 20a and 26a, respectively. The brake shoe 20a is adapted to engage the wheel 3 in a zone located below the plane extending through the axes of the wheels, while the brake shoe 26a is adapted to engage the wheel 2 in a zone substantially diametrically opposite the portion of the wheel engaged by the brake shoe 20.

This brake apparatus also includes brake hangers, not shown, carrying brake shoes which are adapted to engage the wheels 1 and 3, respectively, at points on these wheels substantially opposite the points on the wheels which are engaged by the shoes carried by the brake hangers 5 and 5a. As these brake hangers are located at the ends of the series of wheels they carry only a single shoe and may be of any conventional construction.

This brake apparatus also includes means for actuating the brake hangers to effect the application of the brakes. This means includes brake cylinders, not shown, which have pistons which are connected to a floating lever, not shown, incorporated in the brake rigging, and to which are connected one end of each of the coupling rods 30. In addition, this floating lever has connected thereto a brake beam for actuating the brake hangers, not shown, which carry the shoes which engage the wheels 3 at points opposite the points on the wheels engaged by the shoes 20a.

The other ends of the coupling rods 30 are secured to equalizing levers 32, which are connected by links 34 to a brake beam 36, which extends transversely of the locomotive and has round end portions which extend through the bores in the lower ends of the brake hangers 5a.

The equalizing levers 32 also have coupling rods 40 secured thereto at points on the sides of the coupling rods 30 remote from the points of connection of the links 34. The coupling rods 40 are provided with forked ends which extend above and below the brake beam 36.

The coupling rods 40 are secured to equalizing levers 42 which are connected by means of links 44 with a brake beam 46, which extends transversely of the vehicle and has round end portions which extend through the bores in the lower ends of the brake hangers 5.

The equalizing levers 42 also have coupling rods 50 secured thereto at points on the sides of the coupling rods 40 opposite from the points of connection of the links 44. The coupling rods 50 have forked ends which extend above and below the brake beam 46, and have their other ends secured to portions of the brake rigging, not shown.

The brake apparatus is yieldingly urged by means of a release spring, not shown, to the release position, which is the position in which it is shown in the drawing.

On the supply of fluid under pressure to the brake cylinders the coupling rods 30 are moved to the right, as viewed in Figs. 1 and 2 of the drawing, and their movement is transmitted through the equalizing levers 32 and the links 34 to the brake beam 36, and also to the coupling rods 40, moving the brake beam 36 and the coupling rods 40 to the right.

On movement of the brake beam 36 to the right the lower end of the brake hanger 5a is moved to the right, and after a limited amount of movement of the brake hanger 5a in this direction the brake shoe 20a engages the wheel 3, so that on further movement of the brake hanger 5a the lever 16a moves about the pivotal connection between the lever and the brake shoe 20a, while there is relative movement between the lever 16a and the brake hanger 5a. As a result of this movement of the lever 16a relative to the brake hanger 5a the rounded end portion 22a presses against the bearing face 24a on the lever 18a and moves the lever 18a about the pin 14a so as to press the brake shoe 26a into engagement with the face of the wheel 2.

On movement of the coupling rods 40 to the right the equalizing levers 42 are moved to the right, and their movement is transmitted through the links 44 to the brake beam 46, moving the brake beam 46 to the right.

On movement of the brake beam 46 to the right, the lower end of the brake hanger 5 is moved to the right, and after a predetermined amount of movement of the lower end of the brake hanger in this direction the brake shoe 20 is pressed against the wheel 2, and on further movement of the lower end of the brake hanger 5 to the right, relative rotation takes place between the brake hanger 5 and the lever 16.

As a result of this movement of the lever 16 relative to the brake hanger 5 the rounded end 22 on the lever 16 presses against the bearing face 24 on the lever 18 and moves this lever about the pin 14 so as to press the brake shoe 26 against the wheel 1.

On movement of the equalizing levers 42 to the right the coupling rods 50 are also moved to the right and their movement is transmitted to the portions of the brake rigging, not shown, to effect movement of this portion of the brake rigging to the application position.

It will be seen that on the supply of fluid under pressure to the brake cylinders all of the brake shoes are pressed against the wheels with which they are associated, and that the apparatus is arranged so that a substantial force effective to press any of the shoes against the wheels will not be developed until all of the shoes are moved into engagement with the wheels with which they are associated, and that thereafter all of the shoes are pressed into engagement with the wheels with substantially the same force.

In addition it will be seen that each of the brake hangers which are employed between the driving wheels of the locomotives carries a plurality of brake shoes and that these are pivotally carried by the brake hanger. It will be seen further that the pivotal connection between the shoes and the brake hanger, as well as between the brake hanger and its support and the brake beam are arranged in substantially the same plane so that torsional stresses upon the brake hanger during an application of the brakes will be at a minimum.

While one embodiment of the improved brake apparatus provided by this invention has been illustrated and described in detail it should be understood that the invention is not limited to these details of construction, and that numerous changes and modifications may be made without departing from the scope of the appended claims.

Having now described my invention, what I claim as new and desire to secure by Letters Patent, is:

1. In a brake equipment for a vehicle having a series of pairs of wheels, a brake hanger lever positioned in a plane extending between adjacent wheels, a pair of levers pivotally carried by said brake hanger lever, one of said levers carrying a shoe adapted to engage the wheel on one side of the brake hanger lever, the other of the said levers carrying a shoe adapted to engage the wheel on the other side of the brake hanger lever.

2. In a brake equipment for a vehicle having a series of pairs of wheels, a brake hanger positioned in a plane extending between adjacent wheels, a pair of levers pivotally carried by said brake hanger, each of said levers carrying a brake shoe, and an operating member secured to said brake hanger for moving the brake hanger to the application position, movement of the brake hanger being transmitted between said levers to press the shoes against the wheels.

3. In a brake equipment for a vehicle having a series of pairs of wheels, in combination, a brake hanger positioned in a plane extending between adjacent wheels, a pair of levers pivotally carried by said brake hanger, one of said levers carrying a shoe adapted to engage the wheel on one side of the brake hanger, the other of the said levers carrying a shoe adapted to engage the wheel on the other side of the brake hanger, and means secured to the brake hanger for moving the brake hanger to apply the brakes, the levers and shoes being arranged so that on movement of the hanger towards the application position one of the shoes engages a wheel and so that on subsequent movement of the hanger relative to the lever carrying said shoe the lever effects movement of the other lever to press the other shoe against the other wheel.

4. In a brake equipment for a vehicle having a series of pairs of wheels, in combination, a brake hanger positioned in a plane extending between adjacent wheels, a lever carried by said brake hanger and movable relative thereto about an axis, another lever carried by said brake hanger and movable relative thereto about an axis spaced from the axis of the first named lever, one of said levers carrying a brake shoe adapted to engage the wheel on one side of the brake hanger, the other of these said levers carrying a brake shoe adapted to engage the wheel on the other side of the brake hanger, and means for moving the brake hanger to effect engagement of one of the shoes with a wheel, the lever on which said shoe is carried being operated on movement of the brake hanger relative to the lever to actuate the other lever to move the shoe carried thereby into engagement with the wheel on the other side of the brake hanger.

5. In a brake equipment for a vehicle having a series of pairs of wheels, in combination, a brake hanger positioned in a plane extending between adjacent wheels, a pair of levers pivotally carried by said brake hanger, one of said levers carrying a shoe adapted to engage the wheel on one side of the brake hanger in a zone located on one side of a horizontal plane extending through the axes of the wheels, the other of the said levers carrying a shoe adapted to engage the wheel on the other side of the brake hanger in a zone located on the other side of the said plane.

6. In a brake equipment for a vehicle having a series of pairs of wheels, a brake hanger extending between adjacent ones of the wheels and comprising spaced parallel portions, one end of the said brake hanger being pivotally connected to the vehicle, the other end of the brake hanger having an operating member connected thereto, and a pair of levers positioned between and pivotally secured to said spaced parallel portions, one of said levers carrying a brake shoe adapted to engage the wheel on one side of the brake hanger, the other of the said levers carrying a brake shoe adapted to engage the wheel on the other side of the brake hanger.

7. In a brake equipment for a vehicle having a series of pairs of wheels, a brake hanger extending between adjacent ones of the wheels and comprising spaced parallel portions, one end of the said brake hanger being pivotally connected to the vehicle, the other end of the brake hanger having an operating member connected thereto, and a pair of levers positioned between and pivotally secured to said spaced parallel portions, one of said levers carrying a brake shoe adapted to engage the wheel on one side of the brake hanger, the other of the said levers carrying a brake shoe adapted to engage the wheel on the other side of the brake hanger, the points of connection between the brake hanger and the vehicle, between the operating member and the brake hanger, and between said levers and the brake hanger being disposed substantially in the same plane.

8. In a brake equipment for a vehicle having a series of pairs of wheels, a brake hanger extending between adjacent ones of the wheels and comprising spaced parallel portions, one end of the said brake hanger being pivotally connected to the vehicle, the other end of the brake hanger having an operating member connected thereto, and a pair of levers positioned between and pivotally secured to said spaced parallel portions, one of said levers carrying a brake shoe adapted to engage the wheel on one side of the brake hanger, the other of the said levers carrying a brake shoe adapted to engage the wheel on the other side of the brake hanger, the points of connection between the brake hanger and the vehicle, between the operating member and the brake hanger, and between said levers and the brake hanger being disposed substantially in the plane of the wheels between which the brake hanger extends.

9. In a brake equipment for a vehicle having a series of pairs of wheels, a brake hanger extending between adjacent ones of the wheels and comprising spaced parallel portions, one end of the said brake hanger being pivotally connected to the vehicle, the other end of the brake hanger having an operating member connected thereto, and a pair of levers positioned between and pivotally secured to said spaced parallel portions, one of said levers carrying a brake shoe adapted to engage the wheel on one side of the brake hanger, the other of the said levers carrying a brake shoe adapted to engage the wheel on the other side of the brake hanger, one of the said shoes being pressed against the wheel on movement of the brake hanger by the operating member, the lever on which the shoe is carried operating through the other of the said levers to press the other of the shoes against the wheel on the other side of the brake hanger.

10. In a brake equipment for a vehicle having a series of pairs of wheels, a brake hanger extending between adjacent ones of the wheels and comprising spaced parallel portions, one end of the brake hanger being pivotally secured to the vehicle, the other end of the brake hanger having an operating member connected thereto, brake shoe carrying means positioned between and pivotally secured to the spaced parallel portions, and a pair of brake shoes carried by said means.

11. In a brake equipment for a vehicle having a series of pairs of wheels, a brake hanger extending between adjacent ones of the wheels and comprising spaced parallel portions, one end of the brake hanger being pivotally secured to the vehicle, the other end of the brake hanger having an operating member connected thereto, brake shoe carrying means positioned between and pivotally secured to the spaced parallel portions, and a pair of brake shoes carried by said means, the points of connection between the brake hanger and the vehicle, between the operating member and the brake hanger, and between the brake shoe carrying means and the brake hanger being disposed substantially in the same plane.

12. In a brake equipment for a vehicle having a series of pairs of wheels, a brake hanger positioned in a plane extending between adjacent wheels, and a pair of levers pivotally secured to said brake hanger at points spaced apart, each of said levers carrying a brake shoe, one of said levers being fulcrumed upon the other of the said levers.

13. In a brake equipment for a vehicle having a series of pairs of wheels, a brake hanger positioned in a plane extending between adjacent wheels, and a pair of levers pivotally secured to said brake hanger at points spaced apart, each of said levers carrying a brake shoe, one of said levers having fulcrum engagement with the other of the said levers.

14. In a brake equipment for a vehicle having a series of pairs of wheels, a brake hanger positioned in a plane extending between adjacent wheels, said brake hanger being pivotally secured to the vehicle structure at a point vertically above the axes of the wheels, the pair of levers pivotally carried by said brake hanger, each of said levers carrying a brake shoe, and an operating member pivotally secured to said brake hanger at a point vertically below the axes of the said wheels for moving the brake hanger to the application position, movement of the brake hanger being transmitted between said levers to press the shoes against the wheels.

15. In a brake equipment for a vehicle having a series of pairs of wheels, a brake hanger extending between adjacent ones of the wheels and comprising spaced parallel portions, the brake hanger being pivotally secured to the vehicle structure at a point vertically above the axes of the wheels, an operating member pivotally secured to the brake hanger at a point vertically below the axes of the wheels, and a pair of levers positioned between and pivotally secured to said spaced parallel portions, one of said levers carrying a brake shoe adapted to engage the wheel on one side of the brake hanger, the other of the levers carrying a brake shoe adapted to engage the wheel on the other side of the brake hanger.

16. In a brake equipment for a vehicle having a series of pairs of wheels, a brake hanger extending between adjacent ones of the wheels and comprising spaced parallel portions, the brake hanger being pivotally secured to the vehicle structure at a point vertically above the axes of the wheels, an operating member connected to the brake hanger at a point vertically below the axes of the wheels, brake shoe carrying means positioned between and pivotally secured to said spaced parallel portions, and a pair of brake shoes carried by said means.

CHARLES M. WAGELEY.